United States Patent [19]
Fung et al.

[11] Patent Number: 6,034,019
[45] Date of Patent: Mar. 7, 2000

[54] METHOD OF MINIMIZING IRON CONTAMINATION DURING CATALYST REGENERATION PROCESSES

[75] Inventors: Shun C. Fung, Bridgewater; Walter S. Kmak, Scotch Plains, both of N.J.

[73] Assignee: Exxon Research and Engineering Co., Florham Park, N.J.

[21] Appl. No.: 08/925,519

[22] Filed: Sep. 8, 1997

[51] Int. Cl.$^7$ ...................................................... B01J 20/34
[52] U.S. Cl. ................................. 502/35; 502/38; 502/49; 502/50; 502/53; 502/55; 502/56
[58] Field of Search .................................. 502/35, 38, 49, 502/50, 53, 55, 56

[56] References Cited

U.S. PATENT DOCUMENTS

| | | | |
|---|---|---|---|
| 3,206,413 | 9/1965 | Leopard | 252/411 |
| 4,444,895 | 4/1984 | Fung et al. | 502/37 |
| 4,769,128 | 9/1988 | Boyle | 208/140 |

*Primary Examiner*—Thomas Dunn
*Assistant Examiner*—Christina Ildebrando
*Attorney, Agent, or Firm*—Jay Simon

[57] ABSTRACT

The present invention is directed toward improved processes for the regeneration of noble metal-containing catalysts wherein iron contamination of the catalyst during regeneration is significantly diminished. It has been found that maintenance of any iron present in contact with the catalyst in the oxidized state (e.g., as $Fe_2O_3$ or $Fe_3O_4$) during contact of the catalyst with a source of halogen in the regeneration haliding step results in a marked decrease in the degree of catalyst contamination by iron species.

21 Claims, No Drawings

METHOD OF MINIMIZING IRON CONTAMINATION DURING CATALYST REGENERATION PROCESSES

BACKGROUND OF THE INVENTION

1. Field of the Invention

This invention relates to a method for minimizing iron contamination of reforming or hydroforming catalysts during catalyst regeneration.

2. Description of Related Art

Regeneration and reactivation of noble-metal containing catalysts typically requires one or more cycles of a sequence of steps which include (i) oxidation of the catalyst in an oxidizing atmosphere in a controlled burn off of the carbon from the coked catalyst, (ii) reduction of the oxidized metallic components of the catalysts in a hydrogen atmosphere, and (iii) treatment of the catalyst by contact of same with halogen, an admixture of halogen and oxygen, or an admixture of halogen, halide and oxygen, to redisperse the agglomerated noble metal component, e.g., iridium-containing metallic components. Regeneration and reactivation of the catalyst results in the formation of a large amount of iron scale within the regeneration circuit of the reactor system. When the iron scale is carried into the catalyst bed by the flow stream the iron scale reacts with the catalyst during catalyst regeneration and suppresses the activity of the freshly regenerated catalyst. The migration of scale from the regeneration circuit to the beds of catalyst within the reactor is particularly troublesome at the location in the bed first contacted by the gases from the regeneration circuit, e.g., at the top of the beds in a downflow reactor. Catalyst activity depression at this location can thus be particularly severe when iron is chemically bound to the surface of the catalyst.

Exclusion of the iron scale from contact with the catalyst has been achieved to some extent by a number of prior art techniques. These include dumping the catalyst from the reactor and/or screening off the most contaminated portion of the catalyst in the reactor. However these techniques still leave very fine iron particles adhering to the catalyst or catalyst extrudate surfaces. The installation of an on-stream filter in advance of the reactor has also been tried, but this has resulted in significant capital expenditures, as well as increased production costs due to the pressure drop within the regeneration circuit. Attempts to remove very fine particles using a fine mesh filter also results in an unacceptable pressure drop through the reactor.

However the earlier references do not specifically address how to prevent iron contamination that would render catalyst regeneration less effective. In fact, the relatively high temperatures of greater than 500° C. employed in the hydrogen reduction steps of the regeneration processes disclosed in these patents will also reduce most of the iron scale present in the system to the metallic form of iron, which then makes physical contact with the catalyst particles. This form of iron is in turn reactive with the hydrogen chloride employed later in the process, resulting in the generation of ferrous chloride ($FeCl_2$) which, although non-volatile, has a surface mobility which allows it to move into catalyst particles and contaminate the catalyst

SUMMARY OF THE INVENTION

The present invention is directed toward improved processes for the regeneration of noble metal-containing catalysts wherein iron contamination of the catalyst during regeneration is significantly diminished. It has been found that maintenance of any iron present in the regeneration system in the oxidized state prior to and during contact of the catalyst with a source of halide in the regeneration haliding step results in a marked decrease in the transport of the iron in the system to the catalyst surface. This is accomplished by a first decoking step conducted by heating a deactivated noble metal-containing catalyst in an oxygen-containing atmosphere at a flame front temperature in the range of about 375° C. to about 550° C. for a period of time sufficient to remove a substantial portion of coke from the catalyst while concurrently oxidizing the noble metal and converting iron contaminants present in the system into $Fe_2O_3$. Next, the oxidized catalyst is subjected to reduction by contact with an atmosphere free of elemental oxygen and containing a reducing gas such as hydrogen at a temperature and for a period of time sufficient to reduce the noble metal oxide. In a first embodiment of the invention the reduction temperature is maintained at a lower temperature which is sufficient to substantially reduce said noble metal oxide but insufficient to reduce the $Fe_2O_3$ content of the system, e.g., below about 325° C.

In a second embodiment of the invention, the reducing atmosphere optionally contains at least about 0.5 volume % water and the reduction temperature is maintained at a moderate temperature e.g., a temperature in the range of about 300° C. to about 400° C., wherein the $Fe_2O_3$ content of the system is reduced to predominantly $Fe_3O_4$.

In a third embodiment of the invention, the reduction is conducted at relatively high temperatures, e.g., at temperatures greater than 400° C., wherein the $Fe_2O_3$ content of the system is reduced to predominantly iron metal, followed by contact of the system with a gas stream containing steam (water) under conditions of temperature and for a period of time sufficient to oxidize the iron metal to predominantly $Fe_3O_4$ without substantially oxidizing the reduced noble metal.

The resulting catalyst is then contacted at an elevated temperature with a gas stream containing a halide providing compound, e.g., HCl, which stream is essentially free of elemental oxygen and elemental halogen and which stream contains from zero to less than 6 volume % of added water for a period of time sufficient to provide at least about 1.3 wt % of halide to said catalyst. The presence of water in the gas stream during the halide step is optional only in the first embodiment and where the first decoking step is conducted at temperatures of 425° C. and above.

In a subsequent step of the regeneration, the reduced, agglomerated noble metal is redispersed in the catalyst support by contacting the catalyst at elevated temperatures with a gas stream containing a halogen compound and oxygen or water, or a hydrogen halide and elemental oxygen for a period of time sufficient to redisperse the noble metal within the catalyst support.

The catalyst may then be reduced again prior to use in the reforming process.

DETAILED DESCRIPTION OF THE INVENTION

Catalysts which may be regenerated in accordance with this invention include reforming and/or hydroforming catalysts containing one or a mixture of noble metals dispersed on a suitable support material. Such catalysts include generally, iridium-containing catalysts, with and without co-catalysts, preferably being supported. Other metallic co-catalysts, which can be present with iridium and which are applicable in the process, include metals such as, for example, platinum, rhodium, rhenium, palladium, mixtures thereof and the like. The metals can be present in bimetallic, trimetallic combinations and higher combinations, as alloys, or physical mixtures, on the same support particles or where the metals are individually present on separate support particles. Preferred metal combinations in the catalyst for treatment by the present process are platinum-iridium and platinum-iridium-rhenium.

The metals can be supported on a suitable conventional support, with the proviso that the support is stable during the pretreatment process and does not undergo any deleterious reactions. Representative examples include silica, zeolites, alumina, silica-alumina, zirconia, alumina-zirconia, mixtures thereof and the like. In general, the active metallic components, if supported, are present in an amount of preferably up to about 10 wt % of the supported catalyst.

A preferred catalyst which can be reactivated in the process is agglomerated platinum-iridium, preferably supported on alumina.

The initial step of the catalyst regeneration process requires decoking the catalyst. Decoking is defined herein as the removal of carbon deposits from an agglomerated, deactivated catalyst by combusting the catalyst in an oxygen-containing atmosphere to burn-off the carbon deposits from the catalyst surface. Since the catalyst metal is exposed to the combustion, the catalyst metal and any iron particles present in the catalyst bed are converted to oxides. Decoking also causes the catalyst to further agglomerate. The oxidized iron contaminants present in the catalyst bed form iron oxides, such as $Fe_2O_3$ and some $Fe_3O_4$. Generally, catalysts used in industrial operations contain up to about 10 wt % carbon deposits and are agglomerated up to about a 100% (based on the original catalyst surface area), as evidenced by x-ray diffraction of the catalyst particles. Depending on the decoking conditions, up to about 0.05 wt % to 1.0 wt % carbon deposits may remain based on the weight of the catalyst. In general, the agglomerated catalyst particles may be greater than about 50 Å and up to about 100 Å and greater in crystallite size. Decoking is conducted under a variety of conditions, but is generally conducted by heating the catalyst in an atmosphere containing about 0.01 vol % to about 10 vol % oxygen at flame front temperatures ranging from about 375° C. to about 550° C., more preferably from about 400° C. to about 550° C.

Most of the iron particles are capable of being completely oxidized to $Fe_2O_3$ at low temperature coke burns (400° C. flame). However, complete oxidation of the iron may be limited to the small iron particles, less than 100 micron in size. As a result, the larger iron particles, for the most part, may remain in metallic iron. Large iron particles exhibit low iron transfer because of less contact with the catalyst extrudates per unit weight of iron. However, high levels of iron transfer can be expected if a large amount of large iron particles are present in the catalyst. Therefore, to prevent buildup of iron scale in the reactor, periodic dumping and screening of the catalyst extrudates is still recommended to remove large iron particles.

Decoking removes surface and embedded carbon deposits and particularly, "active" carbon deposits which can react with halogen during the redispersion step and form halogenated species which in turn are not readily removed from the catalyst surface. Generally, about 60 wt % to 100 wt % of carbon deposits are removed during decoking. For example, U.S. Pat. No. 3,904,510 describes a typical decoking procedure applicable to a wide range of agglomerated catalysts containing varying amounts of carbon deposits, differing degrees of agglomeration and varying particle sizes and impurities.

REDUCTION

After decoking, the partially or completely decoked, oxidized and agglomerated catalyst is contacted with a gaseous atmosphere free of elemental oxygen and containing a reducing gas for a period of time and at a temperature sufficient to substantially reduce the noble metal oxide present in the catalyst.

Suitable reducing gases which may be included in the gaseous atmosphere include hydrogen, carbon monoxide, a hydrogen releasing compound and like materials. Hydrogen is the preferred reducing gas. The hydrogen concentration in the gas stream preferably ranges from about 0.05 vol % up to about 6 vol % and at a pressure of about 0.1 MPa up to 2.0 MPa.

The phrase "substantially reduce" as used herein is defined as reducing the numerical amount of noble metal oxides present in the catalyst by about 70 wt % to about 100 wt % and preferably about 90 wt % to about 100 wt %.

In order to minimize iron contamination occurring during the regeneration process, the reduction step must be conducted under conditions such that any iron present in the catalyst or the reactor environment contacting the catalyst be in the form of $Fe_2O_3$ or $Fe_3O_4$ prior to contact with the halide providing agent in the subsequent pretreatment redispersion step.

This is important based on the discovery that iron metal will react with the halide providing agent, e.g., HCl, to form ferrous chloride, e.g. $FeCl_2$, which is an extremely mobile iron species when in contact with the catalyst particle. This mobility allows it to move into catalyst active sites and poison catalyst activity.

Iron in the form of $Fe_3O_4$ also reacts with dry HCl to form $Fe_2O_3$ and $FeCl_2$, but the reaction can be suppressed using water in combination with the halide providing agent during the halide pre-treatment step as will be further hereinafter described.

Iron in the most oxidized form of $Fe_2O_3$ does not react with HCl and therefore catalyst containing iron in this form can be contacted with the halide providing agent without any significant formation of $FeCl_2$. However, where the decoked catalyst from the decoking step contains significant amounts of residual coke, e.g., above about 0.2 wt % of carbon, the combination of $Fe_2O_3$ plus carbon can react with HCl during the halide pretreatment step to form a mixture of $FeCl_2$, carbon dioxide and water. Accordingly, where the initial decoking step is conducted at relatively low temperatures of less than about 425° C. such that carbon in an about of 0.2 wt % or more remains in the catalyst, then it is also desirable to suppress the formation of $FeCl_2$ using water in combination with the halide providing agent during the halide pretreatment step as discussed below.

Accordingly, in a first embodiment of the invention, reduction is conducted at relatively low temperatures in the range of about 200° C. to less than about 325° C., such that the $Fe_2O_3$ content of the system remains predominantly unreduced. By predominantly unreduced is meant that at least 50% by weight, more preferably at least 75% by weight of the $Fe_2O_3$ present in the system remains in that form. The reducing gas atmosphere may optionally also contain water at a level of up to less than 6 vol % of added water to further inhibit reduction of the $Fe_2O_3$.

In a second embodiment of the invention, reduction may be conducted at moderate reduction temperatures in the range of from about 300° C. to about 400° C. wherein the $Fe_2O_3$ content of the system is reduced to predominantly $Fe_3O_4$. By predominantly $Fe_3O_4$ is meant that at least about 50% by weight, more preferably at least about 75% by weight of the $Fe_2O_3$ present in the system is reduced to $Fe_3O_4$, with the balance of the iron being unreduced $Fe_2O_3$. In this embodiment, the reducing gas atmosphere may also optionally contain up to less than 6 vol % water to inhibit excessive reduction to iron metal.

In a third embodiment of the invention, reduction may be conducted at relatively high reduction temperatures in excess of 400° C., e.g. from about 425° C. to about 575° C. Under these conditions, the $Fe_2O_3$ content of the system is reduced predominantly to iron metal. By predominantly iron metal is meant that at least 50% by weight, more preferably at least about 75% by weight of $Fe_2O_3$ present in the system is reduced to iron metal, with the balance of the iron being $Fe_2O_3$, $Fe_3O_4$ or mixtures thereof.

In this embodiment it is necessary to further contact the system with steam after completion of the reduction step and prior to the halide treatment step to convert the iron metal via oxidation back to the oxidized state, e.g., back to predominantly $Fe_3O_4$, but under conditions such that the noble metal remains in the reduced state. This may be readily accomplished by purging hydrogen from the system using an inert gas such as helium, argon or nitrogen, followed by adding into the inert gaseous stream from about 1 vol % to about 6 vol % water at a temperature of from about 400° C. to about 550° C. and preferably from 450° C. to 550° C. and for a period of time sufficient to oxidize the iron metal, i.e., for a period of from about 1 to about 4 hours, while leaving the reduced noble metal in the essentially metallic or reduced state.

HALIDE TREATMENT

Following the reduction step, the decoked-reduced catalyst is then subjected to halide pretreatment with a halide-providing compound. By the term "halide-providing compound" is meant a compound containing ionically or covalently bound halogen which, under the process conditions, can release the halogen in halide form, preferably as hydrogen chloride, to the catalyst surface. Representative examples include haloorgano compounds and preferably hydrogen halides. Haloorgano compounds include chlorocarbons such as methylene chloride, chloroform, methyl chloride, 1,2-dichlorethane, mixtures thereof and the like. The hydrogen halides can be hydrogen fluoride, hydrogen chloride, hydrogen bromide or hydrogen iodide. Preferably hydrogen chloride is the halide-providing compound used in the process. The atmosphere contacting the catalyst in this step can contain other inert gases, e.g., nitrogen, helium or argon, and the like.

It is essential that the atmosphere be substantially elemental oxygen-free during the halide pretreatment. Within this context, the halide feedstream should also preferably be elemental halogen free since it is believed that elemental halogen reacts with surface hydroxyl groups to generate elemental oxygen.

The temperature of the halide pretreatment is generally conducted in the range of about 250° C. to 600° C., and preferably about 300° C. to 540° C., and more preferably about 450° C. to 520° C. and the halide providing compound, at the above-identified temperature, is contacted with the catalyst in a gaseous stream until greater than about 1.3 wt % halide is provided to the catalyst, as detected, for example, by x-ray fluorescence. Preferably, the catalyst is pretreated to a range of about 1.7 wt % to 2.5 wt % halide.

As indicated above, water is an optional component in the halide pretreatment gas where iron present in the catalyst is in the form of $Fe_2O_3$. However, water must be present in the halide pretreatment gas where the catalyst contains $Fe_2O_3$ in conjunction with significant amounts of unremoved carbon, e.g., at least about 0.2% by weight carbon based on catalyst weight. Water must also be present in the halide pretreatment gas where the catalyst contains iron predominantly as $Fe_3O_4$, such as in embodiments two and three discussed above. Thus water may be present in the halide pretreatment gas in a range of from zero up to less than about 6 vol %, with a minimum water content of at least about 0.5 vol % in those embodiments where water is an essential component. Preferred water level in the halide treatment gas is about 2 vol %. In the most preferred mode where water is present and where the halide-providing compound is hydrogen halide, e.g., hydrogen chloride, the volume ratio of added water to hydrogen chloride present in the gas stream is in the range of about 1 to less than 20, more preferably from about 1 to about 10.

Time required for the halide pretreatment will, of course, be dependent on many factors, including flow rate, hydrogen halide gaseous concentrations, amount of catalyst and can be desirably adjusted, for example, to run for about 1 to 3 hours per catalyst regeneration in general. Concentration of hydrogen halide can be from 0.0 vol % to about 5 vol %, or higher, in the feedstream, which can be a total pressure of about 14.7 psig to about 294 psig.

REDISPERSION

The halided catalyst may then be contacted with a gaseous stream containing an elemental halogen or a halogen-containing compound and oxygen or water, or hydrogen halide and elemental oxygen at a preferred temperature of 450° C. to 550° C. The halogen is required for substantially complete redispersion of the catalyst and the elemental oxygen aids the removal of small quantities of carbon deposits which may remain after decoking and improves redispersion efficiency.

The halogen gases are selected from the group consisting of fluorine, chlorine, bromine and iodine and more preferably chlorine. Halogen-containing compounds include haloalkanes such as methyl chlorides. The hydrogen halide gases are selected from the group consisting of hydrogen fluoride, hydrogen chloride, hydrogen bromide and hydrogen iodide, with hydrogen chloride being preferred. The elemental oxygen may be present in the gaseous atmosphere in the amount of about 0.05 vol % to about 25 vol % and the hydrogen halide may be present in the atmosphere in the amount of 0.05 vol % to about 5 vol %. The preferred volume ratio of halogen or hydrogen halide to elemental oxygen ranges from about 0.05 to about 0.5 with a more preferable ratio of 0.067 to 0.2. The gaseous halide and hydrogen halide atmosphere may also contain inert gases such as nitrogen, helium or carbon dioxide from the combustion processes, as well as water vapor.

After redispersion, the catalyst is then preferably reduced prior to its use in the reforming or hydroforming process. Reduction may be conducted by contact of the catalyst with hydrogen at temperatures ranging from about 250° C. to 550° C. for a period of time ranging from about 1 to 10 hours.

A more complete description of catalyst redispersion techniques which may be used herein is found in U.S. Pat. Nos. 4,444,896; 4,444,897; 4,447,551; and 4,473,656, the complete disclosures of which are incorporated herein by reference.

By carrying out the halide pretreatment and redispersion process described herein, substantial redispersion of noble metal-containing catalysts are achieved with the avoidance of iron transfer to the catalyst, particularly catalyst comprising platinum-iridium supported on alumina used in hydrocarbon reforming operations. About 75% to 100% redispersion of both the platinum and iridium agglomerated metals can be achieved. The number of cycles necessary is preferably one. However, in certain cases, such as when minimum treatment past chlorine breakthrough is desired, multicycle redispersion treatments may prove necessary with the concomitant need for additional pretreatment steps.

Apparatus useful for carrying out the regeneration process are conventional in the art, whether operating on a laboratory, pilot plant or full commercial scale.

The following examples are illustrative of the invention.

In many of the following examples, iron oxide in the form of $Fe_2O_3$ fine powder was applied to the catalyst particles to simulate iron contamination of catalyst particles in a commercial reactor due to the deposit of iron scale onto the catalyst surface and conversion of iron scale to the $Fe_2O_3$ state after high temperature coke burn. The size of iron particles loaded on the catalyst extrudate was similar to that in a commercial reactor with periodic dumping and screening of the catalyst to remove large iron particles which do not adhere to the catalyst surfaces.

In order to determine the amount of iron which is chemically bonded to the catalyst extrudate after the redispersion treatment, the iron particles physically adhering to the extrudate were removed by sonic vibration. The sonic vibration involved transferring the discharged catalyst into a beaker containing acetone or other organic liquid, and subjecting it to sonic vibration for 20 minutes. The vibration dislodges the physically adhered iron particles from the catalyst extrudate. Iron contamination of conically cleaned extrudates should be a result of iron bonded chemically to the extrudates due to a reaction between iron and the chlorine containing gases. The iron content and the chloride level of the sonically cleaned catalyst were determined by x-ray fluorescence. The chemical state of the iron was determined by x-ray diffraction using Cu radiation.

$IrO_2$ and Ir x-ray peaks between a redispersed catalyst and a standard catalyst on which the iridium agglomeration has been determined to be 100%. The presence of $Fe_2O_3$ interferes with the Ir metal agglomeration determination since one of the $Fe_2O_3$ x-ray peaks significantly over-laps the Ir peak. Therefore, close to complete removal of $Fe_2O_3$ was required to obtain an accurate Ir metal agglomeration determination.

EXAMPLE 1

A tubular reactor was charged with about 60 grams of 18% agglomerated coke free platinum-iridium catalyst. The catalyst extrudates were coated with fine $Fe_2O_3$ powder to a loading of 2 wt % calculated based on metallic iron. The catalyst contained 0.3 wt % iridium and 0.3 wt % platinum. The catalyst was divided into three equal sections with a quartz wool plug as a spacer between the sections. The catalyst in Section 1 was at the entry of the reactor and the catalyst in Section 3 was at the reactor exit.

The catalyst was treated with a gas mixture of 20% hydrogen in helium at one atmosphere for 96 minutes at 430° C. The catalyst was then treated with 0.91% HCl at 430° C. to HCl breakthrough plus 30 minutes. Then the HCl concentration was lowered to 0.3% and oxygen at 1.2% was added. Temperature was increased from 430° C. to 510° C. and then treatment was continued for 7 hours. The results are given in Table 1. The amount of iron transfer to the extrudate was determined by x-ray fluorescence analysis on a sonically cleaned catalyst. The catalyst extrudate was vibrated in an acetone bath. Most of the physically adhered iron particles were shaken off from the extrudates. The percent iridium agglomeration was determined by x-ray diffraction.

EXAMPLE 2

A catalyst with 100% iridium agglomeration, as $IrO_2$, was coated with fine $Fe_2O_3$ powder to 2 wt % loading calculated based on metallic iron and was treated exactly as in Example 1 except that the temperature in the hydrogen reduction step was lowered from 430° C. to 280° C. Hydrogen was purged out of the reactor before increasing the temperature to 510° C. for the rest of the treatment steps. The results are given in Table 1.

TABLE 1

| EXAMPLE | TEMPERATURE OF $H_2$ REDUCTION ° C. | % Fe ON CATALYST | INITIAL $IRO_2$ % AGGLOMERATION | AVERAGE RESIDUAL % IR AGGLOMERATION AFTER REDISPERSION | % REDISPERSION |
|---|---|---|---|---|---|
| 1 | 430 | 1.61/1.61/1.48 | 18 | 0 | 100 |
| 2 | 280 | 0.29/0.19/0.16 | 100 | 9 | 91 |

X-ray diffraction patterns taken on fresh iridium-containing catalysts show no lines corresponding to any metal component, which indicates that the metal components are present in very small particle sizes, less than about 50 Å. X-ray diffraction patterns, as taken on the same catalysts used in reforming, from which coke has been burned in numerous cycles of use, generally show distinct metal lines which indicate highly agglomerated metal particles of about 10 wt % to 100 wt % agglomeration of crystallites of about 100 Å and greater. Thus, x-ray diffraction is a useful and convenient technique for measuring the extent of metal agglomeration, reduction and redispersion of the catalyst in the subject process.

Additionally, the percent $IrO_2$ and Ir agglomeration on a redispersed catalyst was calculated from the area ratios of Data in Table 1 indicates that iron transfer to the extrudates is greatly reduced when the reduction temperature was lowered to 280° C. The small amount of iron remaining on the sonically cleaned extrudates in Example 2 is mostly due to physically adhered iron oxide particles which cannot be removed by sonic cleaning. The levels of iron on the sonically cleaned catalyst extrudates in this experiment correspond to those obtained in the control samples which have experienced thermal treatment, but not HCl pretreatment or oxychlorination.

The major difference between Examples 1 and 2 is in the temperature of the hydrogen reduction step. Hydrogen reduction in the latter was carried out at a substantially lower temperature, 280° C. After this low temperature reduction, $Fe_2O_3$ remains as $Fe_2O_3$, but $IrO_2$ agglomerates are reduced to metallic iridium. Reaction between HCl and $Fe_2O_3$ is thermodynamically not possible and therefore, no iron transfer was observed. 91% of the iridium was redispersed.

EXAMPLE 3

Dry Hydrogen Chloride Treatment and Oxychlorination

The catalyst loading configuration of Example 1 was used in this example. Iridium in the catalyst extrudates was completely agglomerated to large $IrO_2$ particles. The treatment conditions were the same as Example 1 except that hydrogen reduction was carried out at 350° C. with 6 vol % hydrogen and 2 vol % water. After hydrogen was purged out of the reactor, the temperature of the catalysts was increased to 510° C. under inert gas, helium. Then, HCl pretreatment was carried out with 0.8 vol % HCl in helium for 133 minutes. HCl concentration was lowered to 0.35 vol % for about half an hour before oxychlorination. Oxychlorination was carried out in the presence of 0.35 vol % HCl and 1.3 vol % oxygen. This treatment continued for about 5.6 hours. The amount of iron chemically bonded to the extrudates in the inlet, middle and outlet sections were 0.86, 0.63, and 0.44 wt % respectively. These values are lower than those obtained in Example 1 (hydrogen reduction at 430° C.) but higher than those obtained in Example 2 (hydrogen reduction at 280° C.). X-ray diffraction analysis of the 350° C. reduced catalyst (before HCl pretreatment) indicated that; $Fe_2O_3$ was converted to $Fe_3O_4$. $Fe_3O_4$ reacts with HCl and disproportionate to $FeCl_2$ and $Fe_2O_3$. $FeCl_2$ chemically bonds to the $Al_2O_3$ extrudates. Iridium redispersion was 92%.

EXAMPLE 4

Wet Hydrogen Chloride Treatment and Oxychlorination

Catalysts and catalyst loading configuration in this example was the same as Example 3. The reaction conditions were the same as Example 3 except that in the HCl pretreatment and the subsequent oxychlorination, 2 vol % of water was present. The amount of iron on the extrudates in the inlet, middle and outlet sections were 0.22, 0.24, and 0.22 wt % respectively. These values are similar to those obtained in Example 2. This indicates that iron transfer is inhibited when water is present during the HCl treatment. The presence of water minimizes the reaction between HCl and $Fe_3O_4$. This may be due to the formation of hydroxylated surface layers on the $Fe_3O_4$ particles which protects the iron oxide particles from Hcl attack. Iridium redispersion was 87% which is comparable to that of Example 2.

EXAMPLE 5

350° C. Reduction—Wet HCl Treatment and Oxychlorination

Catalysts and catalyst loading configuration in this example were the same as Example 4. The reaction conditions were the same as Example 4 except that a higher water concentration, 6 vol %, was used in the hydrogen reduction step, the HCl pretreatment step, and the subsequent oxychlorination. The amount of iron on the extrudates in the inlet, middle and outlet sections were 0.21, 0.22, and 0.24 wt % respectively. These values are similar to those obtained in Example 2. This indicates that iron transfer is also inhibited at a higher water concentration in the HCl pretreatment step. However, iridium redispersion decreased to 66% due to a too high $H_2O/HCl$ ratio (17:1), which results in lower catalyst chloride level compared to those obtained in Example 4 after the HCl pretreatment. This result indicates that an $H_2O/HCl$ ratio of 1.5 up to about 10 is sufficient to minimize iron transfer, and levels approaching 20:1 should be avoided because of the detrimental affect on metal redispersion efficiency.

Results obtained in Examples 3–5 are summarized in Table 2.

TABLE 2

| EXAMPLE | WATER CONCENTRATION IN TREAT STEPS | % Fe ON CATALYST | AVERAGE RESIDUAL % IR AGGLOMERATION | % REDISPERSION |
|---|---|---|---|---|
| 3 | None | 0.86/0.63/0.44 | 8 | 92 |
| 4 | 2 | 0.22/0.24/0.22 | 13 | 87 |
| 5 | 6 | 0.21/0.22/0.24 | 34 | 66 |

EXAMPLE 6

510° C. Reduction and Steam Treatment

Catalysts and catalyst loading configuration in this example was the same as Example 3. Hydrogen reduction was at 510° C. The $Fe_2O_3$ powder on the catalyst extrudates was converted to metallic iron and agglomerated $Ir_2$ was reduced to large iridium metal particles. This example demonstrates the oxidation of iron metal particles to $Fe_3O_4$ without exposing Ir metal particles to oxygen. After hydrogen was purged out of the reactor by inert gas, helium, the catalysts were treated with 2 vol % water in helium at 510° C. for 2.5 hours. X-ray diffraction analysis indicated that the iron particles were in the form of $Fe_3O_4$. The subsequent HCl pretreatment and oxychlorination of Example 4 were used to redisperse the agglomerated iridium particles. This example is similar to Example 4 in that the same HCl pretreatment step is employed, including the use of 2% of water in this step. But during the oxychlorination and unlike Example 4, no water was added to the gas stream. This improves iridium redispersion back to 92% and still inhibits iron transfer to the catalyst extrudates. The amount of iron on the extrudates in the inlet, middle and outlet sections were 0.25, 0.28, and 0.21 wt % respectively. Results are summarized in Table 3. The levels of iron on the conically cleaned catalyst extrudates in this experiment correspond to those obtained in the control samples which have experienced thermal treatment, but not HCl pretreatment or oxychlorination.

TABLE 3

| EXAMPLE | H₂ REDUCTION TEMPERATURE ° C. | STEAM TREAT AT 510° C. BEFORE WET HCl TREAT | % Fe ON CATALYST | AVERAGE RESIDUAL % Ir AGGLOMERATION | % REDISPERSION |
| --- | --- | --- | --- | --- | --- |
| 6 | 510 | Yes | 0.25/0.28/0.21 | 8 | 92 |

EXAMPLE 7

This example demonstrates that the presence of coke on the catalyst facilitates iron transfer.

Iron particles in the reactor often are not in the form of $Fe_2O_3$, especially when coke is burned off at moderate and low temperatures, i.e., below about 425° C. The amount of coke left on the catalyst may range from 0.05 wt % to 2 wt % or greater. Iron is most often found in the form of $Fe_3O_4$ and sometimes as metallic iron particles. This example examines the effect of carbon on the oxidation state of iron during heat treatment and iron transfer in the subsequent HCl pretreatment step.

Two catalyst sections were loaded in the reactor. The first section contained 20 grams of 0.3 wt % Pt and 0.3 wt % Ir on $Al_2O_3$ extrudates coated with $Fe_2O_3$ to give 2 wt % iron, calculated based on metallic iron. Additionally, 1 wt % carbon with a surface area of about 800 m²/g was also coated onto the extrudates. The second section was loaded with 20 grams of catalyst extrudates discharged from a commercial reactor. The catalyst extrudates contained 4.7 wt % coke. These extrudates were coated with $Fe_2O_3$ to a 2 wt % loading calculated based on metallic iron. The catalysts were heated up to 510° C. under helium and stayed at this temperature for about 30 minutes. Then, without an intermediate hydrogen reduction step, the catalyst extrudates were treated with 1 vol % HCl for about 2 hours. The amount of iron chemically bonded to the extrudates in the inlet and outlet sections were 1.32 and 1.76 wt % respectively, which is considerably higher than the results achieved in Example 2. Although no hydrogen reduction was used in this example, it appears that HCl has reacted with the iron particles despite the fact that iron was introduced as $Fe_2O_3$. X-ray diffraction analysis of the catalyst after the helium heat treatment indicated the presence of significant amount of $Fe_3O_4$. It appears a significant amount of $Fe_2O_3$ was reduced by carbon to $Fe_3O_4$ during the helium heat treatment. The latter reacts with HCl and iron transfer occurs. Additionally, in the presence of carbon, $Fe_2O_3$ reacts with HCl according to $Fe_2O_3+1/2C+4HCl \rightarrow FeCl_2+1/2CO_2+2H_2O$. The lower amount of iron transfer in the first section is probably due to a lower amount of carbon and non-uniform distribution of carbon in this section. When oxychlorination was added after the HCl pretreatment similar levels of iron transfer were obtained. The oxychlorination was carried out with 0.3 vol % HCl and 2 to 4 vol % oxygen for 4 hours.

EXAMPLE 8

This example illustrates that iron transfer with a catalyst containing coke can be inhibited.

Catalyst and catalyst loading configuration as well as reaction conditions in this example were the same as those of Example 7. The only exception was that water at 0.83 vol % was employed in all the steps, i.e., the catalysts were heated up in helium containing 0.83 vol % water to 510° C. and stayed at this condition for about 1.7 hours. Then, HCl pretreatment was carried out in 1 vol % HCl and 0.83 vol % water for about 1 hour. Next, the catalyst extrudates were oxychlorinated with 0.3 vol % HCl, 2 vol % oxygen, and 0.83 vol % water for about 4 hours. The amount of iron chemically bonded to the extrudates in the inlet and outlet sections were 0.43 and 0.31 wt % respectively. The levels of iron transfer are substantially lower than those in Example 7, but somewhat higher than those of Example 2. Iron transfer appears to diminish but not to be inhibited. Another experiment identical to this example but with higher water concentration, 1.66 vol % in all treat steps did inhibit iron transfer. The amount of iron on the extrudates in the inlet and outlet sections were 0.22 and 0.17 wt % respectively. The levels of iron on the sonically cleaned catalyst extrudates in this experiment correspond to those obtained in the controlled samples which have experienced thermal treatment, but not HCl pretreatment or oxychlorination.

What is claimed is:

1. A process for regenerating a deactivated noble metal-containing supported catalyst which contains iron impurities and coke and wherein iron contamination of the catalyst during regeneration is diminished comprising:
   (a) heating said deactivated catalyst in an oxygen-containing atmosphere at a flame front temperature in the range of about 375° C. to about 550° C. for a period of time sufficient to remove a substantial portion of said coke from said catalyst to oxidize said noble metal and to convert iron contaminants present in said catalyst into predominantly $Fe_2O_3$;
   (b) contacting said oxidized catalyst with an atmosphere free of elemental oxygen and containing a reducing gas at a temperature and for a period of time sufficient to substantially reduce said noble metal oxide and to reduce said $Fe_2O_3$ to predominantly iron metal;
   (c) contacting said reduced catalyst with a gas stream comprising steam under conditions of temperature and for a period of time sufficient to oxidize said iron metal to predominantly $Fe_3O_4$ without substantially oxidizing said reduced noble metal; and
   (d) contacting the catalyst from step (c) at an elevated temperature with a gas stream comprising a halide-providing compound which stream is essentially free of elemental oxygen and elemental halogen and which stream contains from 0.5 to less than 6 vol % added water for a period of time sufficient to provide at least about 1.3 wt % of halide to said catalyst.

2. The process of claim 1 wherein said reducing gas used in step (b) comprises hydrogen.

3. The process of claim 1 wherein said noble metal present in said catalyst comprises iridium.

4. The process of claim 2 wherein said reduction step (b) is conducted at a temperature of greater than 400° C.

5. The process of claim 4 wherein said reduction step (b) is conducted at a temperature in the range of from about 425° C. to about 575° C.

6. The process of claim 1 wherein said reducing atmosphere of step (b) also contains from about 0.5 to less than 6 vol % of added water.

7. The process of claim 6 wherein said reducing atmosphere contains about 2 vol % added water.

8. The process of claim 1 wherein said halide providing compound is hydrogen chloride.

9. The process of claim 8 wherein the volume ratio of added water to hydrogen chloride present in the gas stream of step (d) is in the range of from about 1 to less than 20.

10. The process of claim 9 wherein said ratio is in the range of from 1 to about 10.

11. The process of claim 1 wherein the temperature in halide step (d) ranges from about 300° C. to about 540° C.

12. The process of claim 1 further comprising the step:
   (e) contacting the halided catalyst from step (d) with a gas stream containing elemental halogen, or a mixture of an elemental halogen compound and oxygen or water, or a mixture of hydrogen halide and elemental oxygen at a temperature ranging from about 450° C. to about 550° C. for a time sufficient to redisperse said noble metal catalyst.

13. The process of claim 12 further comprising the step of contacting said redispersed catalyst from step (e) with hydrogen at a temperature in the range of about 250° C. to 550° C. to reduce said catalyst.

14. The process of claim 3 wherein said catalyst is platinum-iridium supported on alumina.

15. The process of claim 3 wherein said catalyst is platinum-iridium-rhenium supported on alumina.

16. The process of claim 1 wherein said gas stream in step (d) contains about 1 to about 2 vol % water.

17. The process of claim 12 wherein said gas stream in step (e) contains a mixture of hydrogen halide and elemental oxygen.

18. The process of claim 17 wherein the volume ratio of hydrogen halide to elemental oxygen is in the range of from about 0.05 to about 0.5.

19. The process of claim 17 wherein said hydrogen halide is hydrogen chloride.

20. The process of claim 1 wherein the gas stream of step (c) contains from about 1 to about 6 volume % steam.

21. The process of claim 20 wherein said step (c) is conducted at a temperature of from about 400° C. to 550° C. for a period of from about 1 to about 4 hours.

* * * * *